(12) United States Patent
Horner

(10) Patent No.: US 6,761,628 B2
(45) Date of Patent: Jul. 13, 2004

(54) CONTROL SYSTEM AND METHOD FOR IMPLEMENTING FIXED CABIN PRESSURE RATE OF CHANGE DURING AIRCRAFT CLIMB

(75) Inventor: Darrell W. Horner, Oro Valley, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/304,267

(22) Filed: Nov. 26, 2002

(65) Prior Publication Data

US 2004/0102150 A1 May 27, 2004

(51) Int. Cl.[7] .............................................. B64D 13/00
(52) U.S. Cl. ...................................... 454/76; 244/118.5
(58) Field of Search ............................. 454/70, 73, 74, 454/75, 76; 244/118.5

(56) References Cited

U.S. PATENT DOCUMENTS

| | | |
|---|---|---|
| 2,873,661 A | 2/1959 | Fischer |
| 3,453,945 A | 7/1969 | Andersen, Jr. |
| 3,473,460 A | 10/1969 | Emmons |
| 3,485,161 A | 12/1969 | Kemper |
| 3,559,559 A * | 2/1971 | Furlong et al. ............... 454/73 |
| 3,974,752 A * | 8/1976 | Burgess et al. ............... 454/73 |
| 4,130,051 A * | 12/1978 | Brudnicki .................... 454/73 |
| 4,164,896 A | 8/1979 | Aldrich |
| 4,164,898 A | 8/1979 | Burgess et al. |
| 4,553,474 A | 11/1985 | Wong et al. |
| 5,186,681 A | 2/1993 | Emmons |
| 5,273,486 A | 12/1993 | Emmons et al. |
| 5,312,072 A * | 5/1994 | Eklund .................... 244/118.5 |
| 5,520,578 A * | 5/1996 | Bloch et al. .................. 454/74 |

\* cited by examiner

*Primary Examiner*—Derek Boles
(74) *Attorney, Agent, or Firm*—Douglas A. Mullen, Esq.

(57) ABSTRACT

An aircraft cabin pressure control system that controls cabin altitude during aircraft ascent to a cruise altitude, such that, under most operational circumstances, the cabin altitude rate of change during the ascent is set to fixed value. The system uses a signal representative of the aircraft's expected cruise altitude. If, however, this signal is not available, the cabin pressure control system controls cabin altitude according to a schedule, and the cabin altitude rate of change may not be fixed during the aircraft's ascent.

30 Claims, 4 Drawing Sheets

CONTROL SYSTEM AND METHOD FOR IMPLEMENTING FIXED CABIN PRESSURE RATE OF CHANGE DURING AIRCRAFT CLIMB

FIELD OF THE INVENTION

The present invention relates to aircraft cabin pressure control and, more particularly, to a system and method for controlling the rate of change of pressure in an aircraft cabin to a substantially constant magnitude during the aircraft's ascent.

BACKGROUND OF THE INVENTION

For a given airspeed, an aircraft may consume less fuel at a higher altitude than it does at a lower altitude. In other words, an aircraft may be more efficient in flight at higher altitudes as compared to lower altitudes. Moreover, bad weather and turbulence can sometimes be avoided by flying above such weather or turbulence. Thus, because of these and other potential advantages, many aircraft are designed to fly at relatively high altitudes.

As the altitude of an aircraft increases, from its take-off altitude to its "top of climb" or "cruise" altitude, the ambient atmospheric pressure outside of the aircraft decreases. Thus, unless otherwise controlled, air could leak out of the aircraft cabin causing it to decompress to an undesirably low pressure at high altitudes. If the pressure in the aircraft cabin is too low, the aircraft passengers may suffer hypoxia, which is a deficiency of oxygen concentration in human tissue. The response to hypoxia may vary from person to person, but its effects generally include drowsiness, mental fatigue, headache, nausea, euphoria, and diminished mental capacity.

Aircraft cabin pressure is often referred to in terms of "cabin pressure altitude," which refers to the normal atmospheric pressure existing at a certain altitude. Studies have shown that the symptoms of hypoxia may become noticeable when the cabin pressure altitude is above the equivalent of the atmospheric pressure one would experience outside at 8,000 feet. Thus, many aircraft are equipped with a cabin pressure control system to, among other things, maintain the cabin pressure altitude to within a relatively comfortable range (e.g., at or below approximately 8,000 feet) and allow gradual changes in the cabin pressure altitude to minimize passenger discomfort.

Aircraft cabin pressure control systems are robustly designed and manufactured, and are operationally safe. Nonetheless, these systems suffer certain drawbacks. For example, some systems implement a control scheme that, in some instances, allows undesirably high cabin pressure rates of change during aircraft ascent. In addition, some cabin pressure control systems implement control schemes in which the cabin pressure rate of change is proportional to the aircraft ascent rate. Because aircraft ascent rate may vary, cabin pressure rate of change may undesirably vary during the aircraft ascent. Both of these situations can be disconcerting to the aircraft passengers and/or crew.

Hence, there is a need for a cabin pressure control system that implements a control scheme that overcomes one or more of the above-noted drawbacks. Namely, a cabin pressure control system and method that does not change cabin pressure at undesirably high rates during aircraft ascent, and/or does not vary cabin pressure rate of change during aircraft ascent, even if aircraft ascent rate varies. The present invention addresses one or more of these needs.

SUMMARY OF THE INVENTION

The present invention provides a cabin pressure control system and method that provides a substantially fixed cabin pressure rate of change magnitude during aircraft ascent.

In one embodiment, and by way of example only, a method of controlling aircraft cabin altitude during aircraft ascent to an aircraft cruise altitude includes determining a target cabin altitude, which corresponds to a desired cabin altitude at the aircraft cruise altitude. Aircraft cabin altitude rate of change is automatically controlled to at least one of a first and a second substantially constant value at least until the target altitude is attained.

In another exemplary embodiment, an aircraft cabin pressure control system includes a controller and an outflow valve. The controller is adapted to receive a signal representative of an aircraft cruise altitude and is operable, in response thereto, to supply valve command signals. The outflow valve is coupled to receive the valve command signals from the controller and is operable, in response thereto, to selectively move between an open and a closed position. The supplied-valve command signals selectively move the outflow valve between the open and closed positions to thereby control aircraft cabin altitude rate of change magnitude to at least one of a first and a second substantially constant value until the aircraft cruise altitude is attained.

In yet another exemplary embodiment, an aircraft cabin pressure control system includes an input signal processor and a rate control processor. The input signal processor is adapted to receive a signal representative of an aircraft's cruise altitude and is operable, in response thereto, to supply a signal representative of target cabin altitude. The target cabin altitude corresponds to a desired cabin altitude when the aircraft has ascended to the cruise altitude. The rate control processor is coupled to receive the target cabin altitude signal and is operable, in response thereto, to supply valve command signals that will selectively move an outflow control valve between an open position and a closed position to thereby control aircraft cabin altitude rate of change magnitude to at least one of a first and a second substantially constant value until the target cabin cruise altitude is attained.

Other independent features and advantages of the preferred cabin pressure control system and method will become apparent from the following detailed description, taken in conjunction with the accompanying drawings which illustrate, by way of example, the principles of the invention.

DETAILED DESCRIPTION OF A PREFERRED EMBODIMENT

Figure 1:
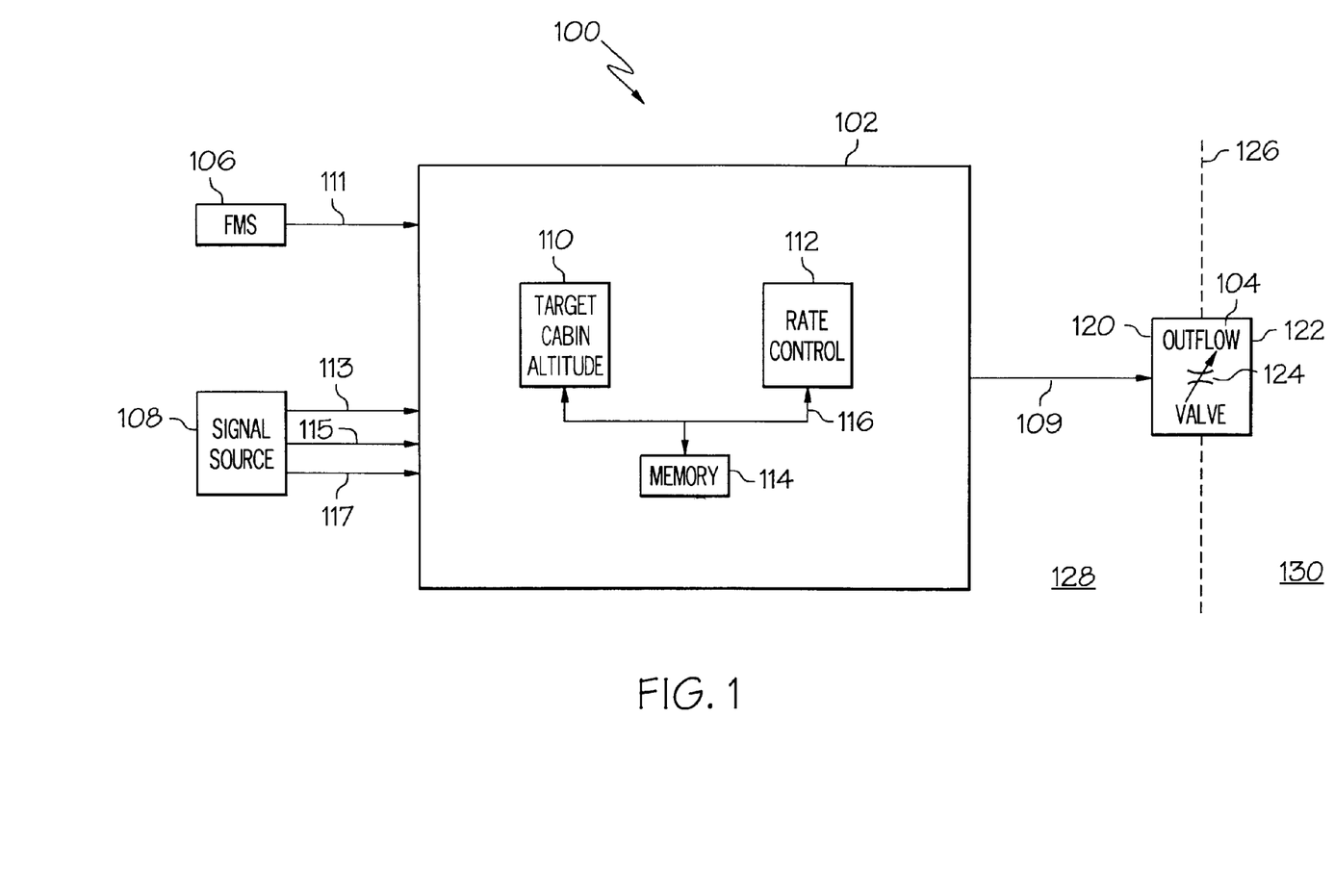
FIG. 1 is a functional block diagram of a cabin pressure control system according to an embodiment of the present invention.

A cabin pressure control system according to an exemplary embodiment is illustrated in FIG. 1. The system 100 includes a controller 102 and an outflow valve 104. The controller 102 is adapted to receive one or more signals from the aircraft's flight management system (FMS) 106, and signals from a signal source 108, which may include various sensors and/or the aircraft avionics equipment. In addition, it will be appreciated that one or more portions of the signal source 108 may be included within the controller 102. The signals supplied from the FMS 106 include at least a signal representative of the aircraft's "top-of-climb" or cruise altitude 111. The signals from the signal source 108 include one or more signals representative of actual aircraft altitude 113, one or more signals representative of actual cabin altitude 115, and one or more signals representative of landing field elevation 117. As will be described in more detail below, the controller 102 uses these signals to implement a control logic scheme, and to supply valve command signals 109 to the outflow valve 104. The position of the outflow valve 104 varies in response to the valve command signals to thereby control aircraft cabin altitude and aircraft cabin altitude rate of change.

The controller 102 includes at least a target cabin altitude processor 110, a rate control processor 112, and memory 114, all interconnected via a communication bus 116. Although, each of these functional blocks is depicted as separate units, it will be appreciated that any two of the functional blocks, or all three of the functional blocks, could be physically implemented in a single integrated circuit, and may be fully or partially implemented in software. The individual depiction of each functional block is provided solely for additional clarity and ease of description.

The target cabin altitude processor 110 receives and processes various ones of the signals supplied to the controller 102, and supplies various signals to the rate control processor 112. In particular, the target cabin altitude processor 110 receives the aircraft cruise altitude signal 111 from the FMS 106, and the actual aircraft altitude signal 113 and landing field elevation signal 117 from the signal source 108. The target cabin altitude processor 110 also receives a signal representative of the maximum allowable cabin-to-ambient differential pressure. This signal may be supplied from the signal source 108, from an on-board memory (not illustrated), or from memory 114. As will be described in more detail below, the target cabin altitude processor 110 implements control logic software stored in memory 114 to process the received signals and to supply a target cabin altitude signal and a scheduled cabin altitude signal to the rate control processor 112.

The rate control processor 112 receives the target cabin altitude signal and the scheduled cabin altitude signal from the target cabin altitude processor 110. The rate control processor 112 also receives the actual aircraft altitude signal 113 and landing field elevation signal 117 from the signal source 108. As will be described in more detail below, the rate control processor 112 implements control logic software stored in memory 114 to process these signals and supply valve command signals 109 that will selectively move the outflow valve 104 to control aircraft cabin altitude and aircraft altitude rate of change. The valve command signals 109 may be supplied directly to the outflow valve 104 or via valve driver circuitry (not illustrated). It will be appreciated that the valve driver circuitry may be included as part of the controller 102 or incorporated into the outflow valve 104.

The outflow valve 104 includes an inlet flow port 120, an outlet flow port 122, and a variable area flow orifice 124 located therebetween to regulate fluid flow. The outflow valve 104 is, for example, preferably mounted on an aircraft bulkhead 126 such that the inlet flow port 120 is exposed to the aircraft cabin 128 and the outlet flow port 122 is exposed to the atmosphere outside of the aircraft 130. Thus, during flight the pressure in the aircraft cabin 128 (e.g., cabin altitude), and the rate of change of aircraft cabin altitude, can be controlled by moving the outflow valve variable area flow orifice 124.

Figure 2:
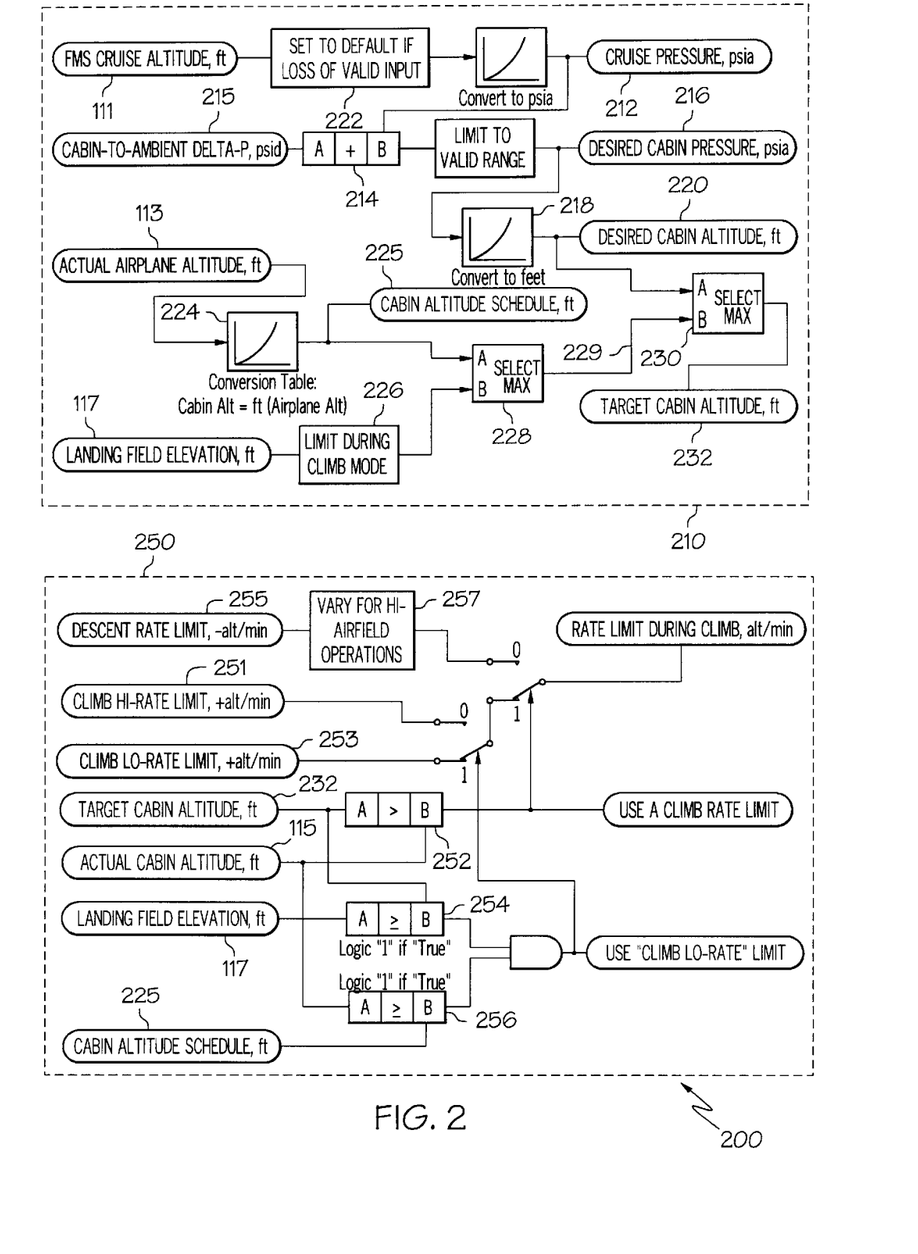
FIG. 2 is a simplified control logic diagram that illustrates the functional logic implemented by the cabin pressure control system of FIG. 1.

The controller 102, as was noted above, implements software control logic to supply valve command signals 109 to the outflow valve 104, to thereby control aircraft cabin altitude and aircraft cabin altitude rate of change. Turning now to FIG. 2, an exemplary embodiment of this control logic will now be described in more detail. As FIG. 2 illustrates, the exemplary control logic 200 may be depicted and described as two control logic modules, the target cabin altitude module 210 and the valve control logic module 250. The preferred control logic 200 is merely depicted and described in this manner for additional clarity and ease of explanation, and is not understood to be so limited. In addition, the control logic 200 is depicted, in some instances, using various schematic symbols that represent physical components. However, it will be appreciated that this is also done for additional clarity and ease of description, and that the control logic could be implemented using one or more of these discrete physical components or be fully implemented in software.

The target cabin altitude module 210 is implemented by the target cabin altitude processor 110. The target cabin altitude module 210 converts the aircraft cruise altitude signal 111 to a signal representative of absolute pressure at the cruise altitude 212. This signal 212 is combined 214 with the signal representative of the maximum allowable cabin-to-ambient differential pressure 215 to supply a signal representative of the desired cabin pressure at the aircraft cruise altitude 216. The desired cabin pressure signal 216 is then converted to feet 218 to supply a signal representative of the desired cabin altitude at the aircraft cruise altitude 220. The target cabin altitude module 210 also includes a default value function 222. The default value function 222 supplies a DEFAULT signal representative of a predetermined aircraft altitude if the aircraft cruise altitude signal 111 from the FMS 106 is lost or is determined to be invalid. The purpose for this will be explained in more detail below.

The target cabin altitude module 210 also implements a conversion function 224 that converts the actual aircraft altitude signal 113 to a scheduled cabin altitude signal 225, and implements a limiter function 226 that limits the magnitude of the landing field elevation signal 117 during aircraft ascent. The scheduled cabin altitude signal 225 is a signal representative of a desired cabin altitude for the presently existing aircraft altitude. Thus, the value of the scheduled cabin altitude signal 225 will vary as the altitude of the aircraft varies during its ascent. It will be appreciated that this conversion function 224 may be implemented as a real-time computation based on one or more continuous or piece-wise continuous functions, or it may be based on a look-up conversion table. The limiter function 226 limits cabin altitude to a predetermined maximum value such as, for example, 8,000 feet, when the landing field elevation signal 117 represents an elevation that exceeds this predetermined maximum value. Thus, cabin pressures that meet various aircraft certification requirements are assured throughout the flight.

A first comparison function 228 implemented by target cabin altitude module 210 functions to compare the scheduled cabin altitude signal 225 and the landing field elevation signal 117, and supplies a back-up target cabin altitude signal 229 based upon this comparison. More specifically, the back-up target cabin altitude signal 229 will be equivalent to the signal that represents a higher altitude. Thus, if the landing field elevation is at a higher altitude than the scheduled cabin altitude, then the back-up target cabin altitude signal 229 is equivalent to the landing field elevation signal 117. Conversely, if the scheduled cabin altitude is higher than the landing field elevation, the back-up target cabin altitude signal 229 is equivalent to the scheduled cabin altitude signal 225.

The target cabin altitude module 210 implements a second comparison function 230 that compares the back-up target cabin altitude signal 229 and the signal representative of the desired cabin altitude at the aircraft cruise altitude 220. The second comparison function 230 supplies a target cabin altitude signal 232 based on this comparison. Specifically, the target cabin altitude signal 232 will be equivalent to the signal that represents the higher cabin altitude. Thus, if the desired cabin altitude at the aircraft cruise altitude is higher than the back-up target altitude, then the target cabin altitude signal 232 is equivalent to the signal representative of the desired cabin altitude at the aircraft cruise altitude 220. If the converse is true, then the target cabin altitude signal 232 is equivalent to the backup target cabin altitude signal 229. In either case, the target cabin altitude signal 232 is supplied to the rate control processor 112. The rate control processor 112 implements the valve control module 250, which will now be described.

The valve control module 250 implements a third comparison function 252 that compares the target cabin altitude signal 232 and the actual cabin altitude signal 115. This comparison indicates whether or not cabin altitude is less than the target cabin altitude. If the cabin altitude is less than the target cabin altitude, the rate control processor 112 will supply valve control signals 109 to the outflow valve 104 that will either control or limit aircraft cabin altitude rate of change to one of two values, a CLIMB HI-RATE LIMIT 251 or a CLIMB LO-RATE LIMIT 253. The particular climb rate limit value that is used will depend upon other comparisons, which are discussed in more detail below. If the cabin altitude is not less than the target cabin altitude, then the rate control processor 112 will supply valve control signals 109 to the outflow valve 104 that will limit aircraft cabin altitude rate of change to a DESCENT RATE LIMIT 255. As further illustrated in FIG. 2, the value of the DESCENT RATE LIMIT 255 may be varied 257. This variability function is provided to accommodate take-offs from relatively high elevations such as, for example, greater than 8,000 feet. When an aircraft takes off from a relatively high elevation, the cabin altitude may need to be descended below a certain level such as, for example, 8,000 feet, at a relatively faster rate than normal before the aircraft reaches its cruise altitude. This ensures that the cabin altitude is below various alarm and/or deployment set points such as, for example, a high cabin altitude warning set point, or the oxygen deployment set point.

It is noted that the valve control signals 109 supplied by rate control processor 112 to the outflow valve 104 will cause aircraft cabin altitude rate of change to be controlled to, and not just limited to, either the CLIMB HI-RATE LIMIT 251 or the CLIMB LO-RATE LIMIT 253 values throughout the aircraft's ascent, if the target cabin altitude signal 232 is based on the aircraft cruise altitude signal 111 from the FMS 106. In other words, as long as the FMS 106 is supplying a valid cruise altitude signal 111, then the cabin pressure control system 100 will control cabin altitude such that the cabin altitude rate of change is fixed throughout the aircraft's ascent to its cruise altitude. The value of the fixed rate of change will be, as just noted, either the CLIMB HI-RATE LIMIT 251 or the CLIMB LO-RATE LIMIT 253. On the other hand, if the target cabin altitude module 210 determines that the target cabin altitude signal 232 should be equivalent to the back-up target cabin altitude signal 229, then the cabin pressure control system 100 will control cabin altitude according to the cabin altitude schedule 225. As a result, the cabin altitude rate of change will not be fixed, but will only be limited to the value of either the CLIMB HI-RATE LIMIT 251 or the CLIMB LO-RATE LIMIT 253.

As was noted above, the aircraft cabin altitude rate of change is either controlled to, or limited to, the CLIMB HI-RATE LIMIT 251 or the CLIMB LO-RATE LIMIT 253, depending upon certain comparisons conducted by the valve control module 250. These additional comparisons will now be discussed. The valve control module 250 implements two other comparison functions, a fourth comparison function 254 and a fifth comparison function 256, in addition to the third comparison function 252 discussed above. The fourth comparison function 254 compares the target cabin altitude signal 232 and the landing field elevation signal 117, and the fifth comparison function compares the actual cabin altitude signal 115 and the scheduled cabin altitude signal 225. If the fourth comparison function 254 indicates that the landing field elevation is higher than or equal to the target cabin altitude, and the fifth comparison function 256 indicates that actual cabin altitude is higher than or equal to the scheduled cabin altitude, then the cabin pressure control system controller 102 will use the CLIMB LO-RATE LIMIT 253. Conversely, if either, or both, of these comparisons indicate otherwise, then the controller 102 will use the CLIMB HI-RATE LIMIT 251.

It is noted that the value of the CLIMB HI-RATE LIMIT 251 is selected based on at least two criteria. First, the value should be a rate that provides a generally acceptable level of comfort to passengers. Second, the value should provide a rate that is fast enough to prevent exceeding the cabin-to-ambient differential pressure limit. Thus, in a particular preferred embodiment, the CLIMB HI-RATE LIMIT 251 is set to +550 sea-level-feet per minute (slf/min) or greater, which meets both of these criteria for a vast majority of flight profiles. Similarly, the value of the CLIMB LO-RATE LIMIT 253 is selected to provide an acceptable passenger comfort level, and is typically a value that is less than +500 slf/min. In a particular preferred embodiment, the value is set to +430 slf/min. The value of the DESCENT RATE LIMIT 255 is also selected based on passenger comfort, and in a particular preferred embodiment it is set to -150 slf/min. It will be appreciated that the values of the CLIMB HI-RATE LIMIT 251, the CLIMB LO-RATE LIMIT 253, and the DESCENT RATE LIMIT 255 are not limited to those recited herein, but may be varied as needed for differing aircraft designs and/or operational situations.

The skilled artisan will recognize that controlling cabin altitude according to a predetermined schedule, and limiting cabin altitude rate of change during ascent is basically the generally known "reactive" cabin pressure control logic. Thus, in the depicted embodiment, the cabin pressure control system 100 will control cabin altitude rate of change to a fixed value as long as the FMS 106 is supplying a valid cruise altitude signal. If the FMS 106 is not available, or is not supplying a valid cruise altitude signal, then default value function 222 supplies a predetermined DEFAULT signal. The DEFAULT signal sets the cruise altitude signal 111 to an arbitrarily low value such as, for example, -2000 feet, so that the target cabin altitude signal 232 will be equivalent to the back-up target cabin altitude signal 229 under these circumstances. Thus, the cabin pressure control system 100 will control cabin altitude rate of change according to the reactive cabin pressure control logic. It will be appreciated that the cabin pressure control system 100 could implement the generally known "adaptive" cabin pressure control logic, rather than the reactive control logic, as the back-up control logic in situations where the FMS 106 is not available, or is not supplying a valid cruise altitude signal 111.

Figure 3:
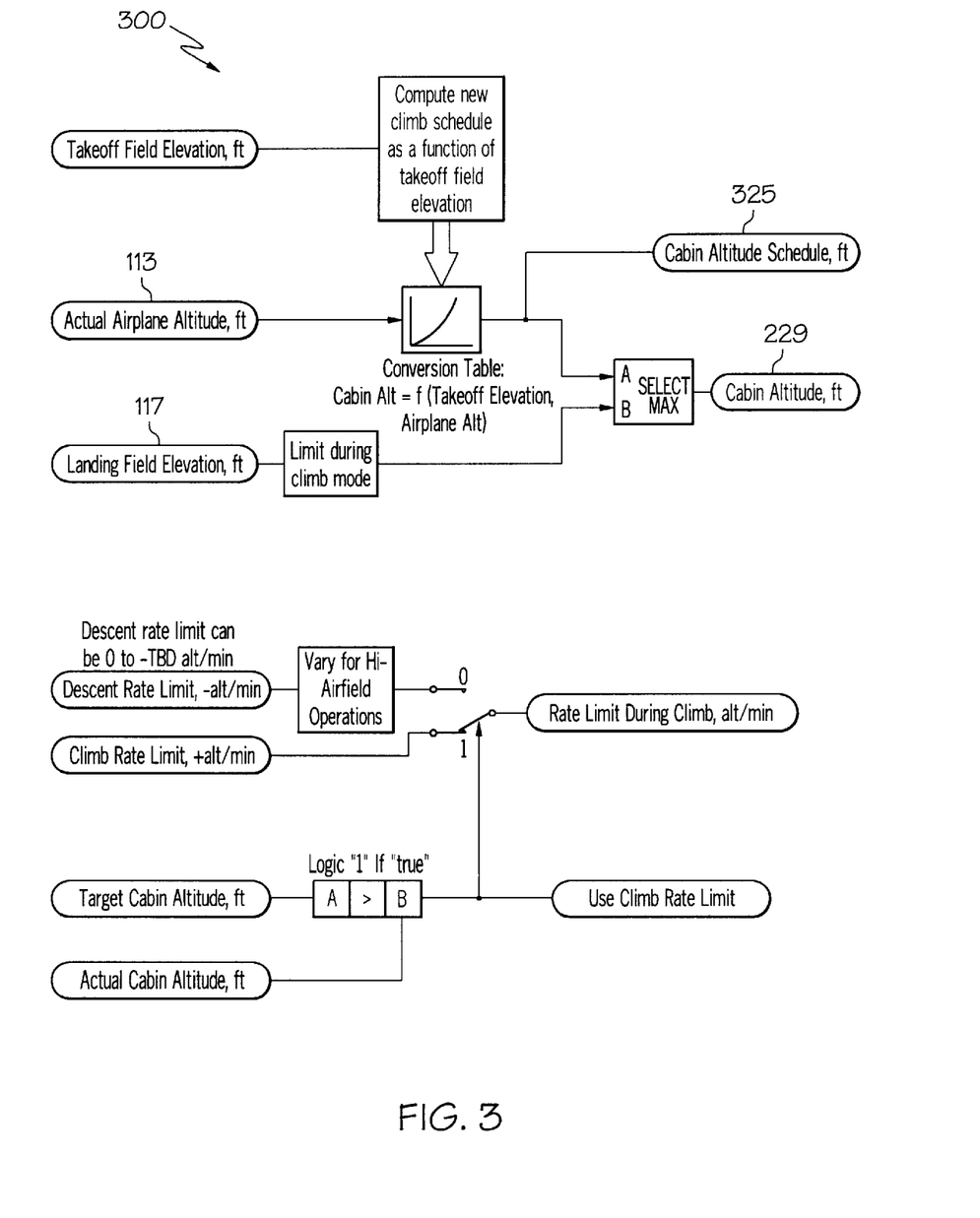
FIG. 3 is a simplified control logic diagram that illustrates an exemplary adaptive cabin altitude control scheme that may be implemented into the control logic of FIG. 2 as the back-up control logic.

As is generally known, the adaptive cabin pressure control logic controls cabin altitude according to an adaptive climb schedule. The adaptive climb schedule is a theoretical cabin altitude schedule that is re-computed in real-time during the aircraft's ascent, and is a function of, for example, take-off field elevation, maximum aircraft climb rate profile, the maximum air altitude, and the maximum cabin-to-ambient differential pressure. An exemplary adaptive control logic diagram 300 is illustrated in FIG. 3. It will be appreciated that if the adaptive control logic 300 is used, then the back-up target cabin altitude signal 229 would be either the landing field elevation signal 117 or an adaptive scheduled cabin altitude signal 325.

Having described the cabin pressure control system 100 and the control logic 200 it implements, a description of the cabin pressure control system operation during an exemplary aircraft ascent to a cruise altitude will now be provided. In doing so, reference should now be made to FIG. 4, which shows a graph of aircraft and cabin altitude versus time during the aircraft's ascent to its cruise altitude.

Figure 4:
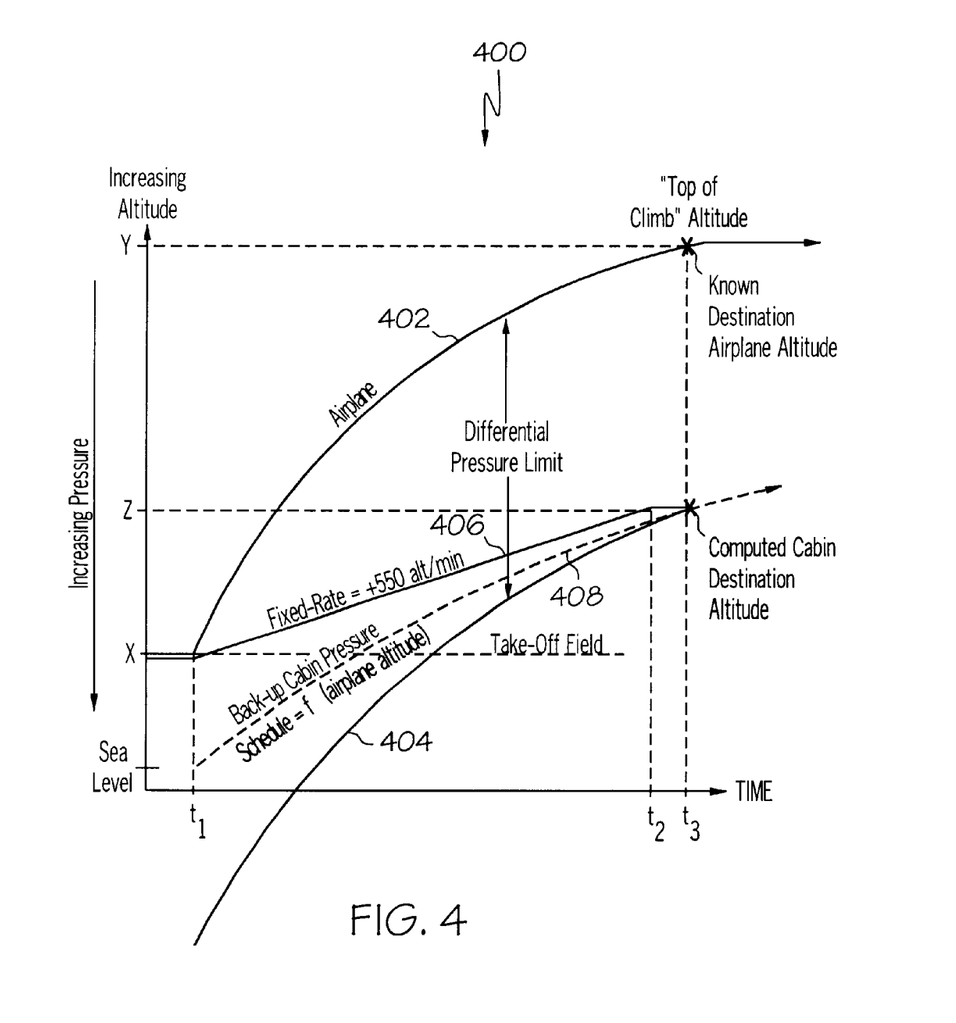
FIG. 4 is graph of aircraft and cabin altitude versus time of an exemplary aircraft climb to a cruise altitude using the control logic when the control logic illustrated in FIG. 2 is employed.

The aircraft is initially on the ground at it's take-off location, or "takeoff field," which is at an altitude relative to sea level. In the depicted example, the take-off field is "X" number of feet above sea level. Prior to take-off, the flight crew enters, among other data, the cruise altitude the aircraft will be ascending to for the flight into the FMS 106. In the depicted example, the cruise altitude is "Y" number of feet above sea level. As was described above, the cabin pressure control system 100 receives a signal representative of the cruise altitude from the FMS 106 and, based at least in part on this signal, determines the desired cabin altitude at this cruise altitude. In the depicted example, the desired cabin altitude is "Z" number of feet above sea level. Thereafter, at some point in time ($t_1$), the aircraft takes off from the take-off field and begins its ascent toward its final cruise altitude.

As the aircraft ascends toward its cruise altitude, as illustrated by curve 402, the cabin pressure control system 100 controls cabin altitude such that it is maintained above curve 404, the cabin-to-ambient differential pressure limit, and such that it increases at a fixed rate of change, as shown by curve 406, until the desired cabin altitude is reached. In the depicted example, the desired cabin altitude is reached at time ($t_2$), and the aircraft reaches its cruise altitude at time ($t_3$). It will be appreciated that if the aircraft ascended at a greater or lesser rate than that depicted in FIG. 4, and reached its cruise altitude before or after time ($t_2$), that the cabin pressure control system 100 would still control cabin altitude rate of change at a fixed value. Thus, the desired cabin altitude would still be reached at time ($t_2$).

Another curve 408, which depicts the scheduled cabin pressure as a function of actual aircraft altitude, is also shown in FIG. 4. As was noted above, if the signal from the FMS 106 is lost, invalid, or otherwise not available during aircraft ascent, then the cabin pressure control system 100 will control cabin pressure according to the scheduled cabin pressure 408, when the scheduled cabin altitude is greater than the landing field elevation.

The cabin pressure control system and method described herein allows cabin pressure to vary at a substantially fixed rate of change during an aircraft ascent to its cruise altitude. The system and method uses a signal representative of the aircraft's final cruise altitude that is supplied from external equipment. If the signal is lost, invalid, or otherwise unavailable, back-up control logic is used, which may not vary cabin pressure at a fixed rate of change.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A method of controlling aircraft cabin altitude during aircraft ascent to a final aircraft cruise altitude, comprising:

determining a target cabin altitude, the target cabin altitude corresponding to a desired cabin altitude at the final aircraft cruise altitude; and automatically controlling aircraft cabin altitude rate of change to a single one of a first or a second substantially constant value until the target cabin altitude is attained.

2. The method of claim 1, further comprising:

determining actual aircraft altitude;

comparing the actual aircraft altitude to the target cabin cruise altitude; and controlling aircraft cabin altitude rate of change magnitude to a third substantially constant value when the actual cabin altitude is greater than the target cabin cruise altitude.

3. The method of claim 1, further comprising:

determining actual aircraft altitude during aircraft ascent; and determining a scheduled cabin altitude based at least in part on the determined actual aircraft altitude.

4. The method of claim 3, further comprising:

determining a landing field elevation, the landing field elevation corresponding to an altitude of a landing destination of an aircraft;

comparing the scheduled cabin altitude to the landing field elevation to determine which is larger in value; and determining a back-up target cabin altitude, the back-up target cabin altitude equivalent to the larger of the scheduled cabin altitude and the landing field elevation.

5. The method of claim 4, wherein the scheduled cabin altitude is one or a reactive scheduled cabin altitude and an adaptive scheduled cabin altitude.

6. The method of claim 4, further comprising:

comparing the target cabin altitude to the back-up target cabin altitude; and controlling the aircraft cabin altitude rate of change magnitude based on the scheduled cabin altitude when the back-up target cabin altitude is larger than the target cabin altitude.

7. The method of claim 3, wherein the first substantially constant value is larger than the second substantially constant value, and wherein the method further comprises determining a landing field elevation, the landing field elevation corresponding to an altitude of a landing destination of an aircraft;

comparing the target cabin altitude to the landing field elevation;

comparing the actual cabin altitude to the scheduled cabin altitude; and controlling aircraft cabin altitude rate of change magnitude to the second substantially constant value when (i) the landing field elevation is greater than or equal to the target cabin altitude and (ii) the actual cabin altitude is greater than or equal to the scheduled cabin altitude.

8. The method of claim 1, wherein the step of determining the target cabin altitude comprises:

determining the aircraft cruise altitude;

converting the aircraft cruise altitude to a cruise pressure;

determining a target desired cabin pressure based on (i) the cruise pressure and (ii) a predetermined maximum differential cabin pressure; and converting the desired cabin pressure to the target cabin altitude.

9. The method of claim 1, wherein the first and second substantially constant values are positive, non-zero values.

10. The method of claim 2, wherein:

the first and second substantially constant values are positive, non-zero values; and the third substantially constant value is one of zero and a value less than zero.

11. An aircraft cabin pressure control system, comprising:

a controller adapted to receive a signal representative of a final aircraft cruise altitude and operable, in response thereto, to (i) supply a target cabin altitude signal that is representative of a desired cabin altitude when the final aircraft cruise altitude is attained and (ii) supply valve command signals; and an outflow valve coupled to receive the valve command signals from the controller and operable, in response thereto, to selectively move between an open and a closed position, wherein the supplied valve command signals selectively move the outflow valve between the open and closed positions to thereby control aircraft cabin altitude rate of change magnitude to a single one of a first or a second substantially constant value until the desired cabin altitude is attained.

12. The system of claim 11, further comprising:

a first sensor operable to sense actual aircraft altitude and supply a signal representative thereof; and wherein:

(i) the controller is further coupled to receive the signal representative of actual aircraft altitude signal, (ii) the controller is further operable to compare the target cabin altitude signal to the signal representative of actual aircraft altitude, and (iii) the controller is further operable to supply valve control signals that will selectively move the outflow valve between the open and closed positions to thereby control aircraft cabin altitude rate of change magnitude to (a) one of the first and the second substantially constant values when actual cabin altitude is less than target cabin cruise altitude and (b) a third substantially constant value when actual cabin altitude is greater than target cabin cruise altitude.

13. The system of claim 12, wherein the controller is further operable to supply a scheduled cabin altitude signal based at least in part on the signal representative of actual aircraft altitude.

14. The system of claim 13, wherein:

the controller is further coupled to receive a signal representative of a landing field elevation and compare this signal with the scheduled cabin altitude signal and is further operable, in response thereto, to supply a back-up target cabin altitude signal; and the back-up target cabin altitude signal is equivalent to one of the scheduled cabin altitude signal and the signal representative of a landing field elevation.

15. The system of claim 14, wherein the controller is further operable to:

compare the back-up target cabin altitude signal and the signal representative of the aircraft's cruise altitude;

supply one of the two signals as a target cabin altitude signal based on the comparison; and implement a back-up altitude control algorithm when the back-up target cabin altitude signal is the signal that is supplied.

16. The system of claim 15, wherein the back-up altitude control algorithm is one of a reactive altitude control algorithm and an adaptive cabin altitude control algorithm.

17. The system of claim 14, wherein:

the first substantially constant value is larger than the second substantially constant value;

the controller is further coupled to receive the target cabin altitude signal, a signal representative of a landing field elevation, the scheduled cabin altitude signal, and the signal representative of actual cabin altitude; and the controller is further operable, in response to the received signals, to supply valve command signals that will move the outflow valve between the open and closed position to thereby control aircraft cabin altitude rate of change magnitude to the second substantially constant value when (i) landing field elevation is greater than or equal to target cabin altitude and (ii) actual cabin altitude is greater than or equal to scheduled cabin altitude.

18. The system of claim 12, wherein the controller is further operable to:

convert the signal representative of an aircraft's cruise altitude to a cruise pressure signal;

supply a desired cabin pressure signal based at least in part on (i) the cruise pressure signal and (ii) a signal representative of maximum cabin differential pressure; and convert the desired cabin pressure signal to the target cabin altitude signal.

19. The system of claim 11, wherein the first and second substantially constant values are positive, non-zero values.

20. The system of claim 12, wherein:

the first and second substantially constant values are positive, non-zero values; and the third substantially constant value is one of zero and a value less than zero.

21. A controller for an aircraft cabin pressure control system, comprising:

an input signal processor adapted to receive a signal representative of an aircraft's final cruise altitude and operable, in response thereto, to supply a target cabin altitude signal, the target cabin altitude signal representative of a desired cabin altitude when the aircraft has ascended to the final cruise altitude; and a rate control processor coupled to receive the target cabin altitude signal and operable, in response thereto, to supply valve command signals that will selectively move an outflow valve between an open position and a closed position to thereby control aircraft cabin altitude rate of change magnitude to at a single one of a first or a second substantially constant value until the desired cabin altitude is attained.

22. The controller of claim 21, wherein:

the input signal processor if further adapted to receive a signal representative of actual aircraft altitude; and the rate control processor is further coupled to receive the signal representative of actual aircraft altitude signal and is further operable to (i) compare the target cabin altitude signal to the signal representative of actual aircraft altitude and (ii) to supply valve control signals that will selectively move an outflow valve between the open and closed positions to thereby control aircraft cabin altitude rate of change magnitude to:

(a) one of the first and the second substantially constant values when actual cabin altitude is less than target cabin cruise altitude, and (b) a third substantially constant value when actual cabin altitude is greater than target cabin cruise altitude.

23. The controller of claim 22, wherein the input signal processor is further operable to supply a scheduled cabin altitude signal based at least in part on the signal representative of actual aircraft altitude.

24. The controller of claim 23, wherein:

the rate control processor is further coupled to receive the scheduled cabin altitude signal and a signal representative of a landing field elevation and is further operable, in response thereto, to supply a back-up target cabin signal; and the back-up target cabin signal is equivalent to one of the scheduled cabin altitude signal and the signal representative of a landing field elevation.

25. The controller of claim 24, wherein:

the input signal processor is further operable to compare the back-up target cabin signal and the signal representative of the aircraft's cruise altitude and, based on the comparison, supply one of the two signals as the target cabin altitude signal based on the comparison; and the rate control processor is further operable to implement a back-up target cabin control algorithm when the back-up target cabin signal is the signal that is supplied.

26. The controller of claim 25, wherein the back-up altitude control algorithm is one of a reactive altitude control algorithm and an adaptive cabin altitude control algorithm.

27. The controller of claim 23, wherein:

the first substantially constant value is larger than the second substantially constant value;

the rate control processor is further coupled to receive the target cabin altitude signal, a signal representative of a landing field elevation, the scheduled cabin altitude signal, and the signal representative of actual cabin altitude; and the rate control processor is further operable, in response to the received signals, to supply valve command signals that will move the outflow valve between the open and closed position to thereby control aircraft cabin altitude rate of change magnitude to the second substantially constant value when (i) landing field elevation is greater than or equal to target cabin altitude and (ii) actual cabin altitude is greater than or equal to scheduled cabin altitude.

28. The controller of claim 21, wherein the input signal processor is further operable to:

convert the signal representative of an aircraft's cruise altitude to a cruise pressure signal;

supply a desired cabin pressure signal based at least in part on (i) the cruise pressure signal and (ii) a signal representative of maximum cabin differential pressure; and convert the desired cabin pressure signal to the target cabin altitude signal.

29. The system of claim 21, wherein the first and second substantially constant values are positive, non-zero values.

30. The system of claim 22, wherein:

the first and second substantially constant values are positive, non-zero values; and the third substantially constant value is one of zero and a value less than zero.

* * * * *